United States Patent
Kim et al.

(10) Patent No.: US 6,549,905 B1
(45) Date of Patent: Apr. 15, 2003

(54) APPARATUS AND METHOD FOR AUTOMATICALLY SEARCHING FOR UPDATED INFORMATION IN AN INTERNET SITE AND/OR A TELETEXT

(75) Inventors: Ki Won Kim, Sungnam (KR); Hyun A Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/434,512

(22) Filed: Nov. 5, 1999

(30) Foreign Application Priority Data

Nov. 19, 1998 (KR) ............................................. 98-50113

(51) Int. Cl.⁷ ............................................. G06F 17/30
(52) U.S. Cl. ...................... 707/10; 707/102; 707/201.2; 709/219; 709/217; 709/218
(58) Field of Search .............................. 707/1, 10, 6, 9, 707/102, 201, 2; 709/217, 218, 219

(56) References Cited

U.S. PATENT DOCUMENTS

| | | | |
|---|---|---|---|
| 5,813,007 A | * 9/1998 | Nielsen | 707/10 |
| 5,898,836 A | * 4/1999 | Freivald et al. | 709/218 |
| 5,978,807 A | * 11/1999 | Mano et al. | 707/10 |
| 5,978,828 A | * 11/1999 | Greer et al. | 709/224 |
| 5,978,833 A | * 11/1999 | Pashley et al. | 709/200 |
| 5,991,760 A | * 11/1999 | Gauvin et al. | 707/10 |
| 6,045,048 A | * 4/2000 | Wilz, Sr. et al. | 235/472.01 |
| 6,184,877 B1 | * 2/2001 | Dodson et al. | 345/327 |
| 6,195,692 B1 | * 2/2001 | Hsu | 709/219 |
| 6,314,094 B1 | * 11/2001 | Boys | 370/352 |
| 6,332,141 B2 | * 12/2001 | Gonzalez et al. | 707/10 |

* cited by examiner

Primary Examiner—Jean R. Homere
Assistant Examiner—Leslie Wong
(74) Attorney, Agent, or Firm—Fleshner & Kim, LLP

(57) ABSTRACT

An apparatus for automatically searching information includes an extraction unit extracting a packet data from a broadcasting signal; an input unit for inputting searching conditions from a user; a receiving unit receiving the searching conditions; a server connection unit connecting a computer to an Internet server under the searching conditions and receiving and transmitting data of an Internet site; an interpreter judging whether the data received and extracted by the server connection unit and the extraction unit meets the searching conditions; a memory storing a content of the Internet site, its address, and time point information of when the site was previously searched by the user in a file form; an output unit transmitting the time point information and the data of the Internet site to the memory; and a microprocessor controlling operations of each element, with which various information desired by a user is searched based on pre-set searching conditions, and desired information out of various information of an Internet site or additional data on a television channel are stored in a memory according to the searching result.

16 Claims, 5 Drawing Sheets

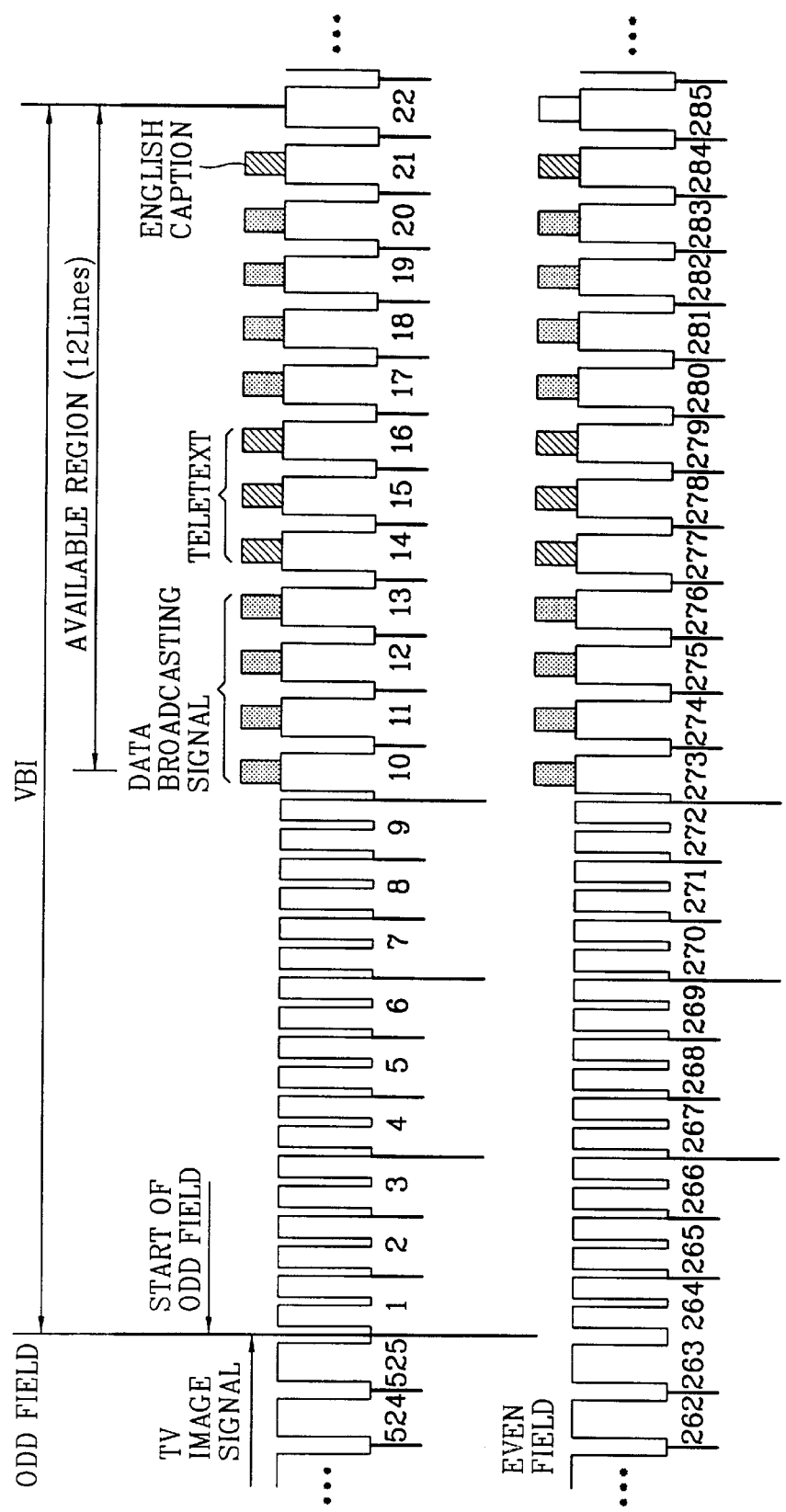

APPARATUS AND METHOD FOR AUTOMATICALLY SEARCHING FOR UPDATED INFORMATION IN AN INTERNET SITE AND/OR A TELETEXT

BACKGROUND OF THE INVENTION

1. Field of the Invention

The present invention relates to an apparatus for automatically searching information based on inputted searching conditions, and more particularly to an apparatus for automatically searching information which is capable of searching information desired by a user based on pre-set searching conditions, and storing desired information out of various information of an Internet site or additional data on a television channel in a memory according to the searching result, and to its method.

2. Description of the Conventional Art

Nowadays, in the so-called 'Information Age', desire and demands for information are rapidly increasing, and thus, access to the Internet compared to an information ocean' to acquire necessary information or to enjoy it for amusement is becoming an indispensable part of daily life. In particular, connections to the world wide web supporting informative data of music, motion pictures, besides still images or text data are being deluged.

In addition, a teletext broadcasting that provides simultaneously and repeatedly a variety of programs by multiplexing text data and other information onto a single TV broadcasting channel provides information which includes news, weather forecasts, TV program guides, leisure-related things, sports, culture, and stock exchange information to viewers, and is expected to extend to various other fields more and more.

Acquiring information by using the Internet is done via personal computers or Internet TV, and most users use "bookmarks" or "favorites" settings that includes the addresses of Internet sites which are their frequently visited sites in using Internet, functions of which are provided by web browser software programs like Netscape Navigator or Microsoft Internet Explorer, as is known. Thus, users can use bookmarks to sequentially input addresses of the bookmarked sites as stored when they get access to the Internet, by which the time and effort required for searching desired information can be much reduced.

Nevertheless, since the Internet providing such a massive amount of information is opened to all the people around the world, searching for desired data requires considerable time and effort, and also in view that the Internet has a characteristic that information is frequently and readily updated and modified on a continual basis, so that even though an Internet site including a desired information is searched, if it is the same information as previously accessed, yet to be updated, not only is an unnecessary communication expense incurred but it results in a waste of time and energy for the efforts.

This could be a serious problem to be considered in case that there are many Internet sites to be searched or the content of each desired Internet site is voluminous.

In addition, since the users have no idea as to when the content of the Internet sites is newly updated, they need to log on the Internet to check the corresponding sites often, i.e., several times per day, causing waste of time and effort.

And, in case of using additional data on a television channel, since its information has a property of a spontaneity, immediacy and changeability, such as news information that is not predictable when and where it may happen, traffic information, stock information required based on a real-time data, sports results as desired, the users must search for such information repeatedly on a display screen like in the case of using the Internet.

In other words, since the users must watch the searching process to get the desired information, they are not able to do any other things during the searching process even if that requires a considerably long time, making it impossible for the information searching to be done in the users' absence.

SUMMARY OF THE INVENTION

Accordingly, an object of the present invention is to provide a method for automatically searching information and its apparatus which is capable of reducing undesirable waste of time and energy in searching information using the Internet.

Another object of the present invention is to provide a method for automatically searching information and its apparatus which is suitable for using additional data on a television channel for users' convenience.

To achieve these and other advantages and in accordance with the purpose of the present invention, as embodied and broadly described herein, there is provided an apparatus for automatically searching information including: an extraction unit extracting a packet data from a broadcasting signal; an input unit for inputting searching conditions from a user; a receiving unit receiving the searching conditions; a server connection unit connecting a computer to an Internet server under the searching conditions and receiving and transmitting data of an Internet site; an interpreter judging whether the data received and extracted by the server connection unit and the extraction unit meets the searching conditions; a memory storing a content of the Internet site, its address, and time point information of when the site was previously searched by the user in a file form; an output unit transmitting the time point information and the data of the Internet site to the memory; and a microprocessor controlling operations of each element.

There is also provided a method for automatically searching information including the steps of: receiving searching conditions for an Internet site from a user; connecting to a desired Internet site on the basis of the searching conditions; judging whether the data of the connected Internet site has been updated; and receiving and storing the data of the connected Internet site in case that the data is newly updated.

In addition, there is provided a method for automatically searching additional data such as teletext data carried on a television channel broadcasting signal including the steps of: receiving searching conditions for an additional data carried on a television channel broadcasting signal; detecting whether a received additional data meets the searching conditions; and storing the additional data when the additional data as received meets the searching conditions.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 4 is a view of a vertical blanking interval (VBI) of a television signal carrying a teletext information.

DETAILED DESCRIPTION OF THE INVENTION

Reference will now be made in detail to the preferred embodiments of the present invention, examples of which are illustrated in the accompanying drawings.

Figure 1:
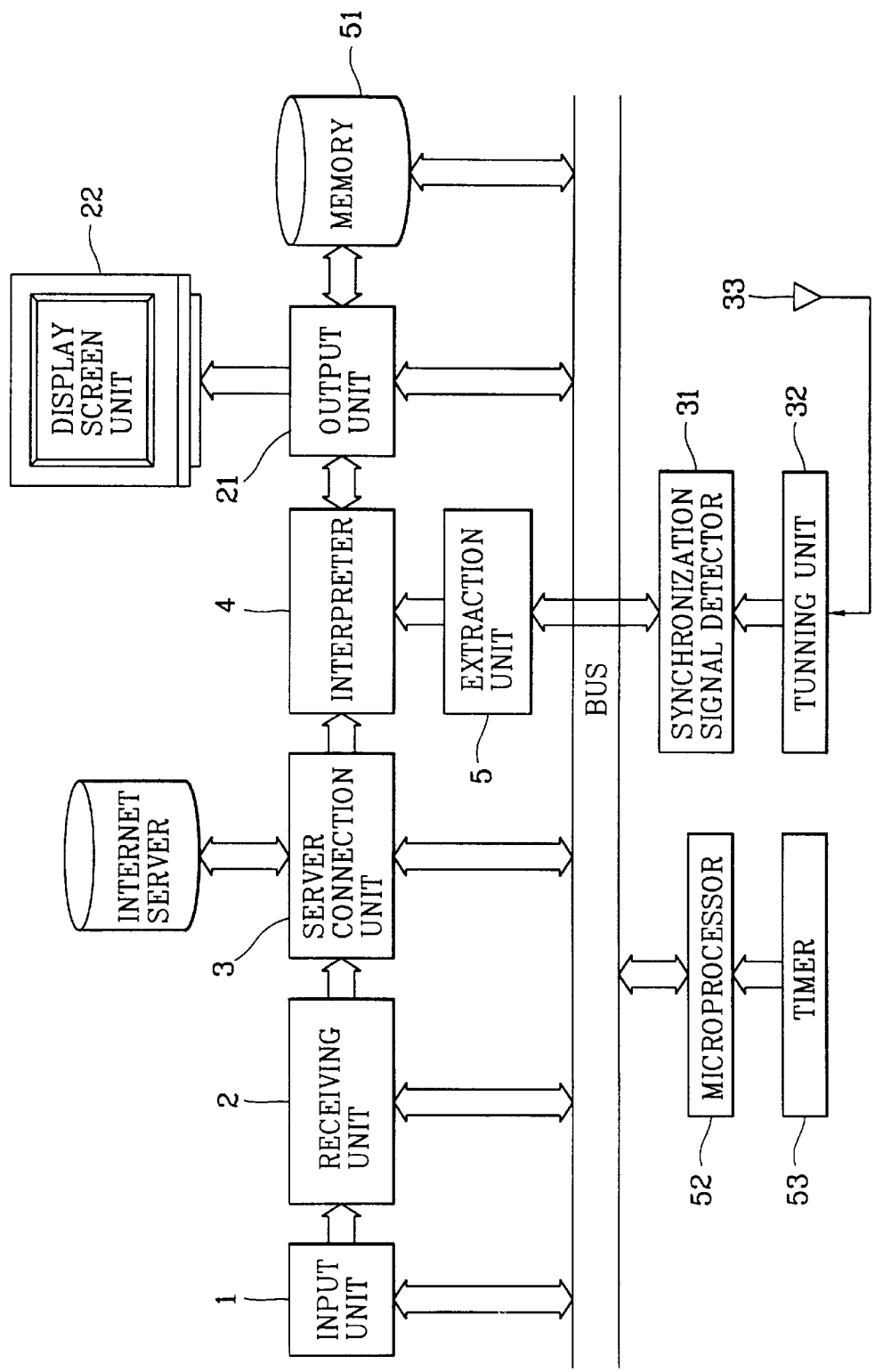
FIG. 1 is a schematic block diagram of an apparatus adopting a method for automatically searching information in accordance with the present invention.

FIG. 1 is a schematic block diagram of an apparatus adopting a method for automatically searching information in accordance with the present invention, which includes a timer 53 indicating a current time; an antenna 33 receiving a broadcasting signal provided from a broadcasting station; a tuning unit 32 tuning the broadcasting signal inputted through the antennas 33 in a corresponding frequency band of a specific channel; a synchronous signal detector 31 detecting a vertical synchronization signal from the tuned broadcasting signal; an extraction unit 5 extracting a packet data designated by the detected vertical synchronizaton signal; an input unit 1 inputting searching conditions by a user (i.e., an address of Internet site, a key word or a searching time, etc.) from a user; a receiving unit 2 receiving the searching conditions inputted from the input unit 1; a server connection unit 3 connecting a computer to an internet server 41 in accordance with the searching conditions and receiving and transmitting data of an Internet site; an interpreter 4 judging whether the data inputted by the server connection unit 3 and the extraction unit 5 meets the searching conditions; a memory 51 storing a content of the Internet site, its address, and a time point information of a previous search by the user in a file form; an output unit 21 for outputting the result as judged by the interpreter 4 to a display screen unit 22 and transmitting the time point information and the data of the Internet site to the memory 51; and a microprocessor controlling operations of each element via a bus line.

The input unit 1 may include a keyboard of a personal computer, a remote-controller of a TV set, or an OSD (on screen display) display unit, by which a user inputs searching conditions.

In case of searching an Internet site, the searching conditions would be addresses of the sites to be searched, a domain name (referred to as a position information hereinafter), or a desired searching time point, while, in case of searching additional data on a TV channel, searching conditions would be a keyword and a searching time point. The searching time point may be set on a periodical basis by days or weeks.

The searching conditions are all stored in an internal memory (not shown) of the microprocessor 52, and the internal memory is made of a non-volatile memory so that the searching conditions may not be lost even though the power is turned off. Having an infrared receiver function, the receiving unit 2 receives and processes the searching conditions inputted by a remote-controller.

The microprocessor 52 judges whether the current time is identical to the searching time as inputted by the user, in a manner that it calculates the current time, that is, a total lapse of time from a time lapse signal periodically provided from the timer 53 and compares the calculated current time with a searching reservation time stored at the internal memory.

If the current time reaches the reserved searching time, connection is made to the Internet to search the designated site and the content of the site is stored as follows:

When the current time reaches the reserved searching time, the microprocessor 52 attempts connection to the internet server 41 providing an Internet service by means of the server connection unit 3 and confirms the connection by the server connection unit 3, and, if the connection is not made, it keeps attempting connection repeatedly until the connection is made successfully.

When the connection to the Internet server is successfully made, the microprocessor 52 reads a position information of the Internet site designated as a searching condition from the internal memory, and the position information is transmitted to the Internet server 41 through the server connection unit 3 for connecting to the designated site.

When the connection is made to the desired Internet site, the content data of the corresponding site is received by the interpreter 4 through the server connection unit 3. The interpreter 4 extracts a time point information (referred to as a first time point information) when the content of the Internet site was generated from the received content data under the control of the microprocessor 52 and reads a time point information (referred to as a second time point information hereinafter) corresponding to the addresses of the various sites already stored in the memory 51 and the time point information corresponding to the addresses. The microprocessor 52 compares the addresses as read with those of the Internet sites as connected. Upon comparison, if the connected Internet site is not a stored one in the memory, the microprocessor 52 judges that the connected site is first designated as a searching—object site, and then stores the address of the connected site, the time point information, and the content of the site in the memory 51 in a file form through the output unit 21.

Meanwhile, upon comparison of the site addresses, if the connected Internet site is a stored one, the microprocessor 52 compares the first time point information corresponding to the connected Internet site with the second time point information. Upon such comparison, if the first time point information is later than the second time point information, the microprocessor judges that the content of the corresponding Internet site has been updated. If the content data has been updated, the microprocessor 52 stores the address of the site, the time point information, and the content data of the site in a file form in the memory 51 through the output unit 21. And at the same time, the output unit 21 outputs a message, for example, 'the information of the designated Internet site has been updated', for informing the user that the data has been updated to the display screen unit 22 under the control of the microprocessor 52.

By doing those operations as described above, the Internet site is automatically searched according to the inputted searching conditions.

The method for automatically searching information will now be described with reference to FIGS. 2A and 2B.

Figure 2A:
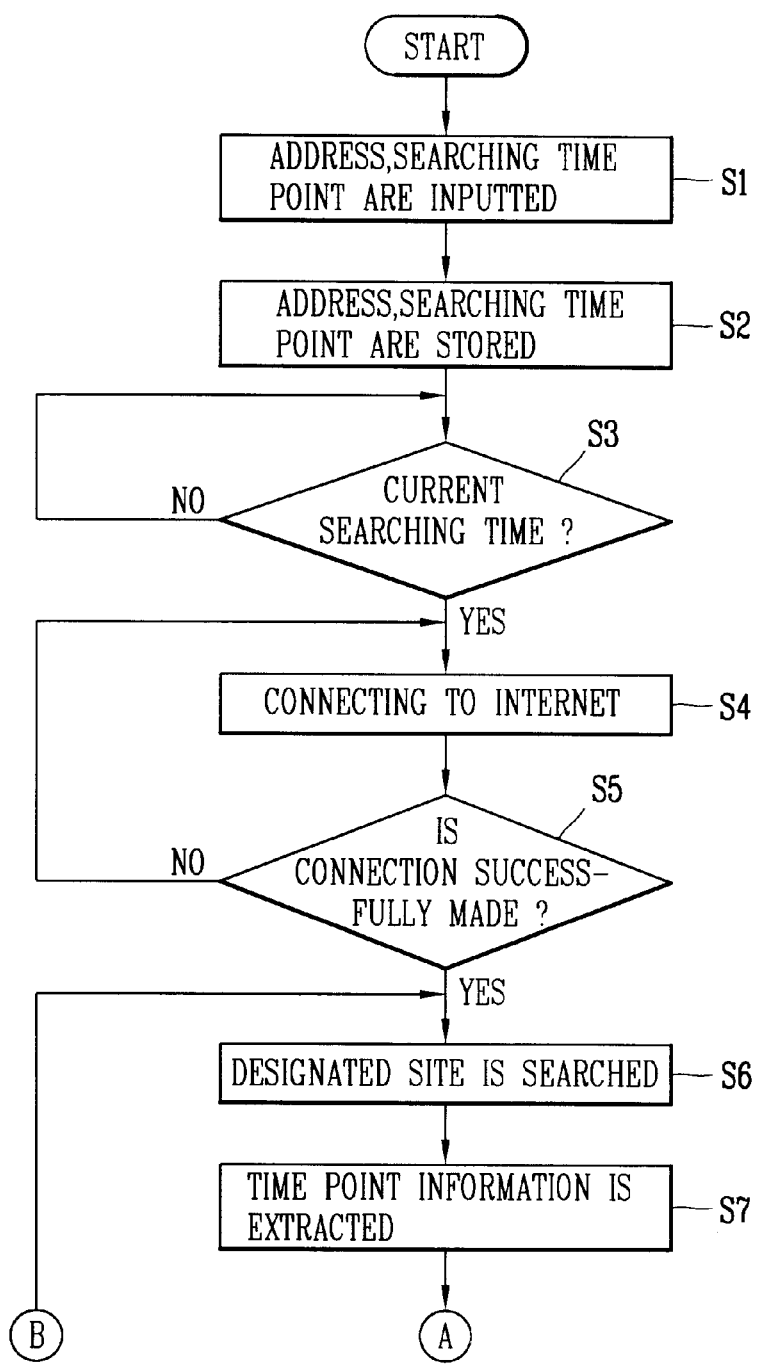
FIGS. 2A and 2B are flow charts of a method for automatically searching information in accordance with one embodiment of the present invention.
Figure 2B:
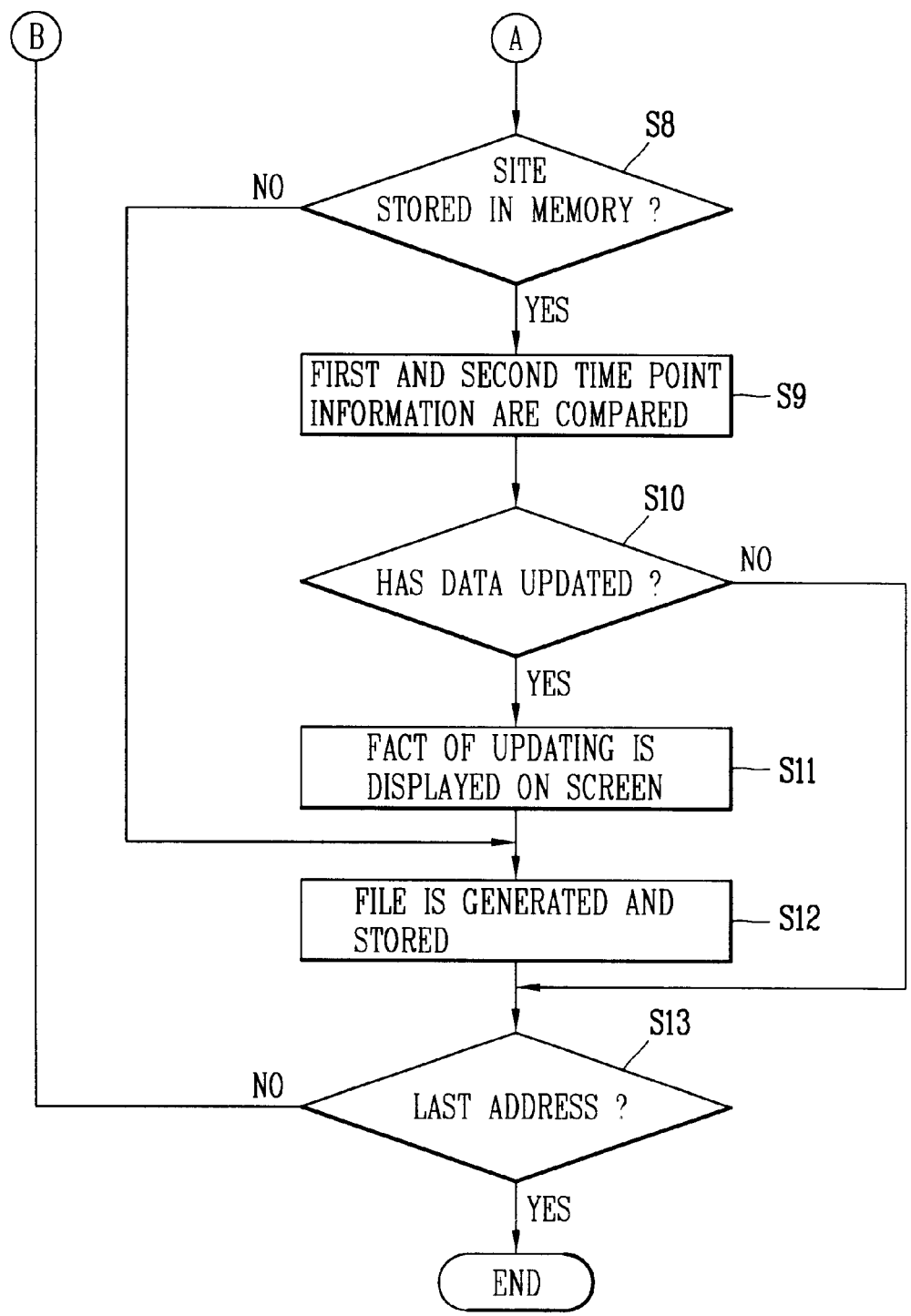

FIGS. 2A and 2B are flow charts of a method for automatically searching information in accordance with one embodiment of the present invention.

First, the case that the user sets a searching time so that plural position information are to be searched simultaneously will now be explained.

The user inputs a desired position information and a time point for searching through the input unit 1 in a step S1. The position information and the searching time point are stored in the internal memory (not shown) by the microprocessor 52 in a step S2.

The microprocessor 52 judges whether the current time is identical to the reserved searching time as was previously inputted by the user, in a manner that it calculates the current time, that is, a total lapse of time from a time lapse signal periodically provided from the timer 53 and compares the calculated current time with the reserved searching time stored in the internal memory in a step S3.

If the current time has reached the reserved searching time, connection is made to the Internet to search the designated site and the content of the site is retrieved and stored as follows.

When the current time reaches the reserved searching time, the microprocessor 52 attempts connection to the internet server 41 providing an internet service by means of the server connection unit 3 and confirms the connection by the server connection unit 3, and if the connection is not made in steps S4–S5, it keeps attempting connection repeatedly until the connection is successfully made.

If the connection to the Internet server is successfully made, the microprocessor 52 reads a position information of the Internet site designated as a searching condition from the internal memory, and the position information is transmitted to the internet server 41 through the server connection unit 3 for connecting to the designated site. When the connection is made to the desired Internet site, the data of the corresponding site is received by the interpreter 4 through the server connection unit 3 in a step S6.

The interpreter 4 extracts a first time point information when the content of the Internet site was generated from the received data under the control of the microprocessor 52 in a step S7.

Thereafter, the microprocessor 52 judges whether the connected site is one of the sites stored in the memory 51 in a step S8. If the connected site is one of the sites stored in the memory 51, the microprocessor 52 reads the first time point information and the second time point information of the previous connection to that site stored in the memory 51 to compare them in a step S9.

Upon such comparison, if the first time point information is later than the second time point information, the microprocessor 52 judges that the data in currently being received is an updated data in a step S10, and the output unit 21 outputs a message, for example, 'the information of the designated Internet site has been updated', for informing the user that the data has been updated to the display screen unit 22 according to the command of the microprocessor 52 in a step S11.

And, at the same time, the microprocessor 52 updates the data being received through the interpreter 4 and stores it in the file of the corresponding formerly received data from the site in a step S12.

If the connected site is not one stored in the memory 51, the microprocessor 52 stores the data being received through the interpreter 4 in a new file in a step S12.

By performing the above described operations, automatic searching and updating of information on the position information of the first Internet site are performed.

Next, the microprocessor 52 judges whether there is any more position information designated as a searching condition in the internal memory in a step S13, and if there is further position information, it reads a position information of the next site and transmits an address of the site to the Internet server 41 to change the site connection in the step S4. The microprocessor 52 sequentially performs the operations of searching data received from the changed site, confirming whether it has been updated, updating the data, and storing it in steps S5–S12 in the same manner as described above. Thereafter, when the microprocessor 52 confirms that the position information of the currently connected site is the last position information stored in the internal memory in a step S13, the connection is logged off.

Meanwhile, unlike the above case where the reserved searching time inputted as a searching condition is the same for the plural position information, the case that the reserved searching times for the plural position information as inputted are designated differently will now be described.

When the current time reaches a reserved searching time, only the corresponding Internet site related to the reached searching time is searched, and data is stored according to whether or not the data of the searched Internet site has been updated in the steps S4–S12.

A method for automatically searching additional data on a television channel, and its apparatus will now be described with reference to FIGS. 1 and 3.

Figure 3:
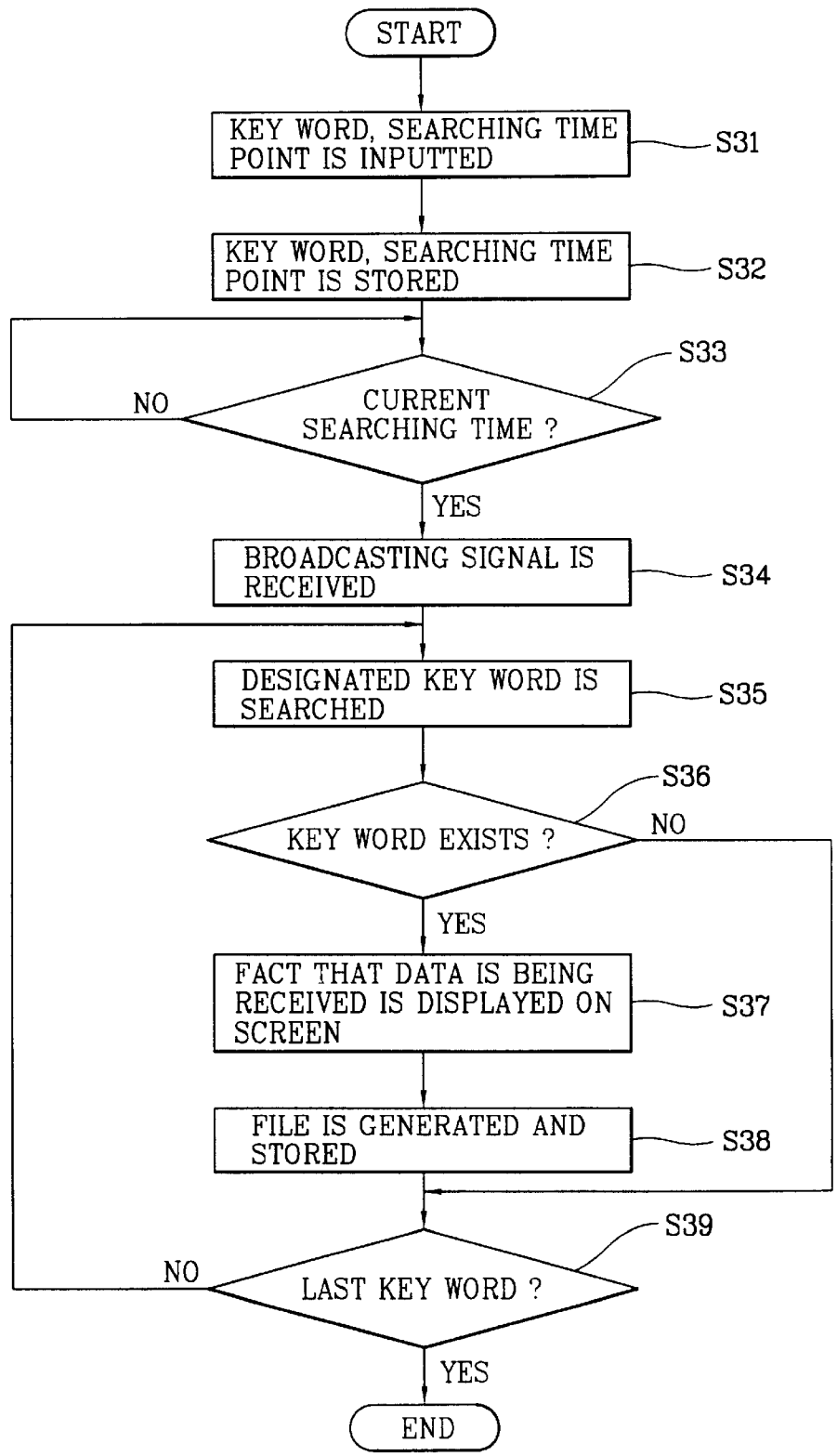
FIG. 3 is a flow chart of a method for automatically searching information in accordance with another embodiment of the present invention.

FIG. 3 is a flow chart of a method for automatically searching additional data on a television channel in accordance with the present invention.

First, a user inputs a desired key word (i.e., stocks, traffic, weather, home shopping, etc.) via the input unit 1, and at this time, a time reserved for searching the data content corresponding to the inputted key word is also inputted in a step S31. The inputted key word and the reserved searching time are stored in an internal memory (not shown) of the microprocessor 52 in a step S32.

As described above with reference to FIGS. 2A and 2B, the microprocessor 52 compares the current time with the reserved searching time stored in the internal memory. If the current time has reached the reserved searching time in a step S33, the tuning unit 32 tunes an inputted broadcasting signal and a pre-set channel information to be identical upon receipt of the broadcasting signal from the antenna 33 in a step S34, and the synchronization signal detector 31 detects a vertical synchronization pulse.

The extraction unit 30 extracts a teletext information (for example, positioned in horizontal scanning lines 14H–16H in case of an odd field) existing within the vertical blanking interval of the tuned channel's signal as shown in FIG. 4. The teletext information is inputted to the extraction unit 30 at a predetermined interval after the vertical synchronization pulse is detected.

The extracted teletext information is transmitted to the interpreter 4 to be sequentially compared with the key word stored in the internal memory of the microprocessor 52 so that the designated key word is searched in a step S35.

Upon comparison, if it is confirmed that the extracted data includes the key word in a step S36, the microprocessor 52 judges that an information corresponding to the designated key word is being received and outputs a message, that is, for example, 'a stock information has been received', for displaying on the display screen unit 22 through the output unit 21 in a step S37.

Simultaneously, the microprocessor 52 stores the received data in a corresponding file (i.e., stock.doc) generated in the memory 51 in a step S38. In addition, if data including another key word is searched besides the already searched key words S39, the microprocessor 52 stores it in another file produced according to the key words in the steps S35–S38.

In case that the searching times are differently designated according to each designated key word, when the current time reaches a designated searching time, the microprocessor searches the key word from the received data and stores the corresponding data in the steps S33–S38.

The above-described method for automatically searching additional data wirelessly received from the TV broadcasting station and storing it can be also applied for searching additional data transmitted by an analog TV broadcasting station, a digital broadcasting satellite (DBS) or via cable TV.

As so far described, according to the method for automatically searching information of the present invention, when the content of the Internet site is updated, it is automatically searched to be stored, which fact is displayed on a screen for the user's information, so that the user can easily be aware that the information has been updated without having to manually connecting to the Internet sites one by one, saving inconvenience. Also, the occasionally updated information is confirmed without missing as it is changed. In addition, besides the information of the Internet site, only that information (including specific key words) desired by the user among additional broadcasting service data provided by broadcasters through the DBS, digital (or analog) TV, or cable TV is automatically searched, and it is stored as classified, thereby enhancing and enriching the searching environment.

It will be apparent to those skilled in the art that various modifications and variations can be made in the present invention without departing from the spirit or scope of the invention. Thus, it is intended that the present invention cover such modifications and variations provided they come within the scope of the appended claims and their equivalents.

What is claimed is:

1. A method for automatically searching information comprising:

storing an address of an Internet site and storing a first time point information based on update information contained within the Internet site;

establishing a connection to the Internet site based on a searching condition;

judging whether the data of the connected Internet site is newly updated by determining a second time information based on update information contained within the Internet site upon establishing the connection to the Internet site; and receiving and storing data of the Internet site only when the first time point information and the second time point information are different.

2. The method according to claim 1, wherein the searching condition includes at least one of an address of an Internet site and a reserved searching time point.

3. The method according to claim 2, wherein the reserved searching time points are periodical.

4. An apparatus for automatically searching information comprising:

an extraction unit for extracting an information data from a broadcasting signal;

an input unit for inputting searching conditions from a user;

a receiving unit for receiving the searching conditions;

a server connection unit for connecting a computer to an Internet server under the searching conditions and for receiving and transmitting data of an Internet site;

an interpreter for judging whether the data respectively received via the server connection unit or extracted by the extraction unit meets the inputted searching conditions;

a memory for storing a content of the Internet site received via the server connection, its address, and time point information in a file form or storing information received via the broadcasting signal;

an output unit for transmitting the time point information and the data of the Internet site received via the server connection unit or the information received via the broadcasting signal to the memory; and a microprocessor for controlling operations of each element, wherein the time point information is based on data received from the Internet site that the content of the Internet site has been changed.

5. The apparatus according to claim 4, wherein the input unit comprises a key board, a remote-controller or an on screen display (OSD) unit.

6. The apparatus according to claim 4, wherein the display screen unit includes a display monitor of a personal computer or a TV set.

7. The apparatus according to claim 4, wherein the memory stores a content and address of the Internet site, and a time point information in a file.

8. An apparatus for automatically searching information comprising:

means for storing information data corresponding to a destination of a network;

means for inputting a search condition regarding the destination;

means for establishing a connection to the destination by at least one of receiving a broadcast signal and a server connection;

means for comparing previously stored information data of the destination with information data received upon establishing the connection to the destination; and means for storing the received information data of the destination if the comparing means indicates that the previously stored information is different from the information data received upon establishing the connection to the destination via the server connection.

9. The apparatus of claim 8, wherein the storing means further stores the received information data of the destination via the broadcast signal when the searching condition is satisfied.

10. The apparatus of claim 8, wherein the search condition includes an address of an Internet site to be search via the server connection and a reserved searching time point.

11. The apparatus of claim 8, wherein the comparing means includes:

an interpreter that determines a time point information included in the received information data from the destination, which is indicative that a content of received information has been changed, and a microprocessor which judges that a previously stored time point information and a received time point information determined by the interpreter are different upon establishing the connection to the destination via the server connection.

12. The apparatus of claim 11, wherein means for establishing the connection to the destination comprises a server connection for automatic connection to an Internet server upon the search condition being satisfied and the destination is an Internet site.

13. A method for automatically updating data received from a destination within a network, comprising:

establishing a connection to the destination based on a search condition;

storing a destination update information received from the destination, wherein the destination update information is indicative of whether the data of the destination has changed; and storing the data received from the destination based on the destination update information.

14. An information searching apparatus comprising:

a memory for storing at least one of (1) data related to a content of an Internet site, an address for connection to an Internet site via an Internet connection, and a time point information which is indicative of whether the data has changed and (2) data contained within a broadcast signal;

an interpreter for at least one of (1) interpreting the data received from the Internet site to determine a received time point information and (2) comparing at least one stored keyword with teletext information contained within the broadcast signal; and a microprocessor for at least one of (1) comparing the received time point information with the previously stored time point information to allow storage of received data related to the content of an Internet site and the received time point information if the received time point information is different from the previously stored time point information, and (2) determining that data related to the keyword is being received via the broadcast signal if the interpreter determines that there is a match between the keyword and the teletext data.

wherein the microprocessor provides a notification only when the received time point information is different from the previously stored time point information.

15. The information searching apparatus of claim 14, wherein a reserved time point is stored in the memory.

16. The information searching apparatus of claim 14, wherein a reserved time point and keyword is stored in an internal memory of the processor.

\* \* \* \* \*

UNITED STATES PATENT AND TRADEMARK OFFICE
CERTIFICATE OF CORRECTION

PATENT NO. : 6,549,905 B1
APPLICATION NO. : 09/434512
DATED : April 15, 2003
INVENTOR(S) : Ki Won Kim et al.

It is certified that error appears in the above-identified patent and that said Letters Patent is hereby corrected as shown below:

In columns 7-10, replace independent claim 1, 4, 8 and 13 with the following independent claims 1, 4, 8 and 13.

1. A method for automatically searching information comprising:
storing an address of an Internet site and storing a first time point information based on update information contained within the Internet site;
establishing a connection to the Internet site based on a searching condition;
judging whether the data of the connected Internet site is newly updated by determining a second time information based on update information contained within the Internet site upon establishing the connection to the Internet site;
receiving and storing data of the Internet site only when the first time point information and the second time point information are different; and
displaying a notification that updated data of the Internet site is being stored.

4. An apparatus for automatically searching information comprising:
an extraction unit for extracting an information data from a broadcasting signal;
an input unit for inputting searching conditions from a user;
a receiving unit for receiving the searching conditions;
a server connection unit for connecting a computer to an Internet server under the searching conditions and for receiving and transmitting data of an Internet site;
an interpreter for applying whether the data respectively received via the server connection unit or extracted by the extraction unit meets the inputted searching conditions;
a memory for storing a content of the Internet site received via the server connection, its address, and time point information in a file form or storing information received via the broadcasting signal;
an output unit for transmitting the time point information and the data of the Internet site received via the server connection unit or the information received via the broadcasting signal to the memory;
a microprocessor for controlling operations of each element, wherein the time point information is based on data received from the Internet site that the content of the Internet site has been changed; and
a display screen unit for displaying information that the data of the Internet site has been updated.

UNITED STATES PATENT AND TRADEMARK OFFICE
CERTIFICATE OF CORRECTION

PATENT NO.        : 6,549,905 B1
APPLICATION NO.   : 09/434512
DATED             : April 15, 2003
INVENTOR(S)       : Ki Won Kim et al.

It is certified that error appears in the above-identified patent and that said Letters Patent is hereby corrected as shown below:

8. An apparatus for automatically searching information comprising:
      means for storing information data corresponding to a destination of a network;
      means for inputting a search condition regarding the destination;
      means for establishing a connection to the destination by at least one of receiving a broadcast signal and a server connection;
      means for comparing previously stored information data of the destination with information data received upon establishing the connection to the destination;
      means for storing the received information data of the destination if the comparing means indicates that the previously stored information is different from the information data received upon establishing the connection to the destination via the server connection; and
      means for providing a notification only when previously stored information is different from the information data received upon establishing the connection to the destination via the server connection.

13. A method for automatically updating data received from a destination within a network, comprising:
      establishing a connection to the destination based on a search condition;
      storing a destination update information received from the destination, wherein the destination update information is indicative of whether the data of the destination has changed;
      storing the data received from the destination based on the destination update information;
      wherein the search condition includes a plurality of addresses of Internet sites and a reserved time point for each address; and
      wherein upon satisfying the reserved time point per address,
      automatically establishing the connection to the Internet site based on the address;
      comparing a previously stored destination update information corresponding to the address and the destination update information received from the Internet site to determine if there is a difference;
      storing data related to a content of the Internet site only when the received destination update information is different from the previously stored destination update information; and

UNITED STATES PATENT AND TRADEMARK OFFICE
CERTIFICATE OF CORRECTION

PATENT NO.       : 6,549,905 B1
APPLICATION NO.  : 09/434512
DATED            : April 15, 2003
INVENTOR(S)      : Ki Won Kim et al.

It is certified that error appears in the above-identified patent and that said Letters Patent is hereby corrected as shown below:

providing a notification only when the data related to the content of Internet site has been updated based on the comparison of the previously stored destination update information and the received destination update information.

Signed and Sealed this

Twenty-sixth Day of August, 2008

JON W. DUDAS
*Director of the United States Patent and Trademark Office*

UNITED STATES PATENT AND TRADEMARK OFFICE
CERTIFICATE OF CORRECTION

PATENT NO.       : 6,549,905 B1
APPLICATION NO. : 09/434512
DATED            : April 15, 2003
INVENTOR(S)      : Ki Won Kim et al.

It is certified that error appears in the above-identified patent and that said Letters Patent is hereby corrected as shown below:

In columns 7-10, replace independent claim 1, 4, 8 and 13 with the following independent claims 1, 4, 8 and 13.

Column 7, Claim 1, lines 33-48 should read
1. A method for automatically searching information comprising:
storing an address of an Internet site and storing a first time point information based on update information contained within the Internet site;
establishing a connection to the Internet site based on a searching condition;
judging whether the data of the connected Internet site is newly updated by determining a second time information based on update information contained within the Internet site upon establishing the connection to the Internet site;
receiving and storing data of the Internet site only when the first time point information and the second time point information are different; and
displaying a notification that updated data of the Internet site is being stored.

Column 7, Claim 4, line 54 thru Column 8, line 14 should read
4. An apparatus for automatically searching information comprising:
an extraction unit for extracting an information data from a broadcasting signal;
an input unit for inputting searching conditions from a user;
a receiving unit for receiving the searching conditions;
a server connection unit for connecting a computer to an Internet server under the searching conditions and for receiving and transmitting data of an Internet site;
an interpreter for applying whether the data respectively received via the server connection unit or extracted by the extraction unit meets the inputted searching conditions;
a memory for storing a content of the Internet site received via the server connection, its address, and time point information in a file form or storing information received via the broadcasting signal;
an output unit for transmitting the time point information and the data of the Internet site received via the server connection unit or the information received via the broadcasting signal to the memory;
a microprocessor for controlling operations of each element, wherein the time point information is based on data received from the Internet site that the content of the Internet site has been changed; and
a display screen unit for displaying information that the data of the Internet site has been updated.

UNITED STATES PATENT AND TRADEMARK OFFICE
CERTIFICATE OF CORRECTION

PATENT NO. : 6,549,905 B1
APPLICATION NO. : 09/434512
DATED : April 15, 2003
INVENTOR(S) : Ki Won Kim et al.

It is certified that error appears in the above-identified patent and that said Letters Patent is hereby corrected as shown below:

Column 8, Claim 8, lines 25-43 should read
8. An apparatus for automatically searching information comprising:
means for storing information data corresponding to a destination of a network;
means for inputting a search condition regarding the destination;
means for establishing a connection to the destination by at least one of receiving a broadcast signal and a server connection;
means for comparing previously stored information data of the destination with information data received upon establishing the connection to the destination;
means for storing the received information data of the destination if the comparing means indicates that the previously stored information is different from the information data received upon establishing the connection to the destination via the server connection; and
means for providing a notification only when previously stored information is different from the information data received upon establishing the connection to the destination via the server connection.

Column 9, Claim 13, lines 1-11 should read
13. A method for automatically updating data received from a destination within a network, comprising:
establishing a connection to the destination based on a search condition;
storing a destination update information received from the destination, wherein the destination update information is indicative of whether the data of the destination has changed;
storing the data received from the destination based on the destination update information;
wherein the search condition includes a plurality of addresses of Internet sites and a reserved time point for each address; and
wherein upon satisfying the reserved time point per address,
automatically establishing the connection to the Internet site based on the address;
comparing a previously stored destination update information corresponding to the address and the destination update information received from the Internet site to determine if there is a difference;
storing data related to a content of the Internet site only when the received destination update information is different from the previously stored destination update information; and

UNITED STATES PATENT AND TRADEMARK OFFICE
CERTIFICATE OF CORRECTION

PATENT NO.        : 6,549,905 B1
APPLICATION NO. : 09/434512
DATED             : April 15, 2003
INVENTOR(S)       : Ki Won Kim et al.

It is certified that error appears in the above-identified patent and that said Letters Patent is hereby corrected as shown below:

providing a notification only when the data related to the content of Internet site has been updated based on the comparison of the previously stored destination update information and the received destination update information.

This certificate supersedes the Certificate of Correction issued August 26, 2008.

Signed and Sealed this

Seventh Day of October, 2008

JON W. DUDAS
*Director of the United States Patent and Trademark Office*